United States Patent [19]

Schickling et al.

[11] 4,235,489
[45] Nov. 25, 1980

[54] EXTERNAL DEVICE FOR SELECTIVELY CONVERTING A PILLOW BLOCK BETWEEN FREE AND HELD POSITIONS

[75] Inventors: Joseph H. Schickling, Cherry Hill, N.J.; Walter Hyduk, Southampton, Pa.

[73] Assignee: SKF Industries, Inc., King of Prussia, Pa.

[21] Appl. No.: 933,858

[22] Filed: Aug. 15, 1978

[51] Int. Cl.³ .............................................. F16C 43/00
[52] U.S. Cl. ................................ 308/236; 308/207 R; 308/DIG. 11
[58] Field of Search ................... 308/207 R, 189, 206, 308/74, DIG. 11, 236; 277/56, 188 R, 188 A

[56] References Cited

U.S. PATENT DOCUMENTS

| | | | |
|---|---|---|---|
| 2,003,605 | 6/1935 | Oelkers | 277/56 |
| 2,136,125 | 11/1938 | Delaval-Crow | 308/DIG. 11 |
| 3,520,580 | 7/1970 | Simmers | 308/207 R |
| 4,012,154 | 3/1977 | Durwin et al. | 308/236 |
| 4,030,785 | 6/1977 | Robinson et al. | 308/207 R |

Primary Examiner—Lenard A. Footland
Attorney, Agent, or Firm—Eugene E. Renz, Jr.

[57] ABSTRACT

A pillow block assembly including a housing having an internal seat for a bearing and retaining means in the form of snap rings on both sides of the outer ring for limiting axial displacement of the outer ring of the bearing in the seat. The pillow block is convertible between free and held units. One form of conversion device comprises a screw member including a conical tip which engages in an annular groove in the outer ring having tapered circumferential sidewalls complementing the tip of the screw member. The screw member is actuatable between a first position permitting movement of the outer ring relative to the housing and a second position preventing axial movement of the outer ring in the pillow block housing. The screw member has a port extending therethrough and a head portion with a lubricant fitting and at least one radial port is provided in the outer ring connecting the annular groove to the interior of the bearing. This arrangement permits lubrication of the bearing through the screw member.

In another embodiment, the conversion device includes another groove in the pillow block seat outboard of an enlarged groove for one of the pair of retaining rings and a third retaining ring mounted in the other outboard groove. The third retaining ring is spaced in a manner to eliminate play between the pair of spaced retaining rings and the outer bearing ring. The outboard ring locks the outboard seal plate of the labyrinth seal at opposite ends of the bearing against the floating retaining ring to confine the outer ring tightly between the retaining rings.

11 Claims, 16 Drawing Figures

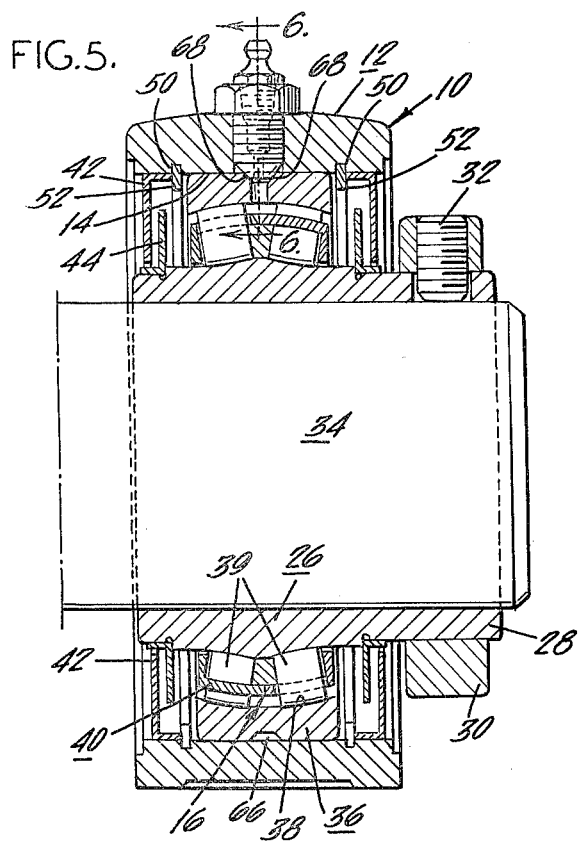
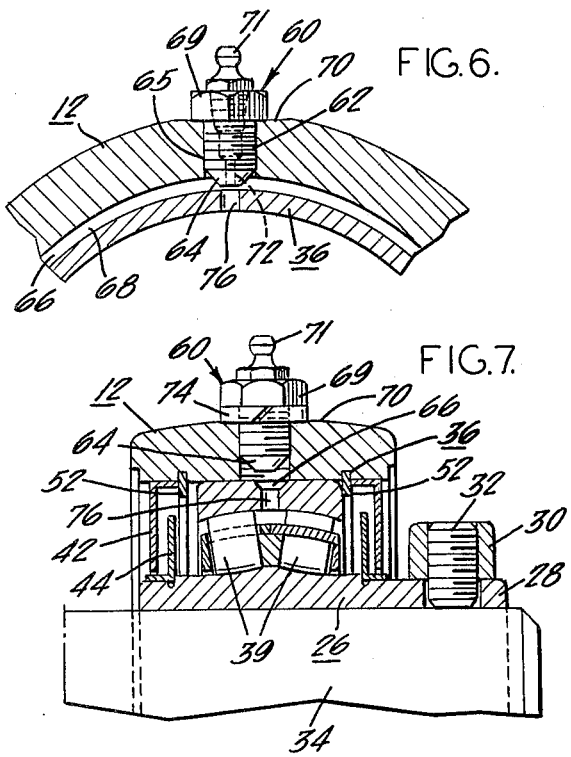
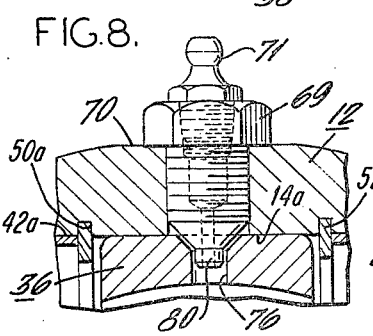
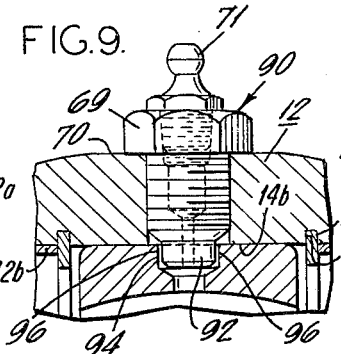
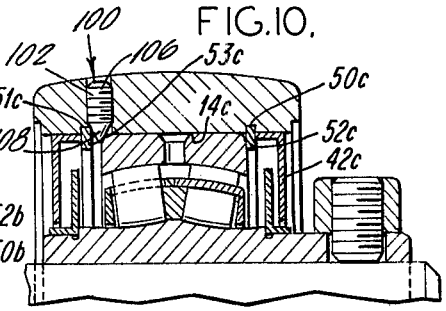
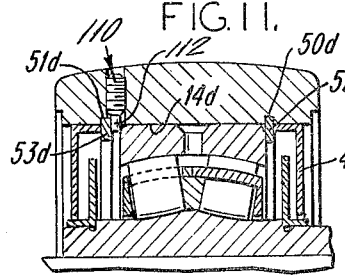
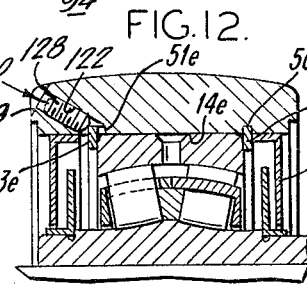
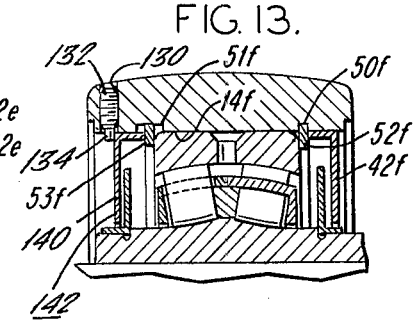
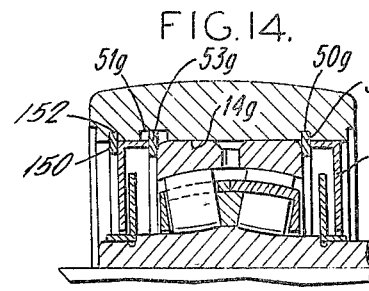
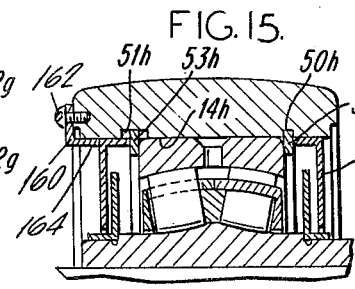
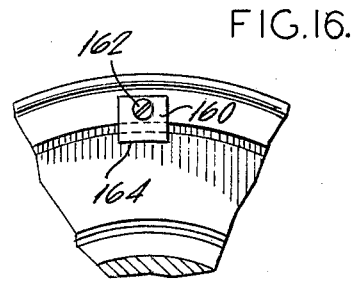

EXTERNAL DEVICE FOR SELECTIVELY CONVERTING A PILLOW BLOCK BETWEEN FREE AND HELD POSITIONS

BACKGROUND OF THE INVENTION

The present invention relates to pillow block assemblies and more specifically to a novel external device for selectively converting a pillow block from a "free" to "held" unit or from a "held" to a "free" unit.

The term "free" as used herein shall refer to a pillow block arrangement wherein the bearing assembly has limited axial movement or displacement relative to the pillow block and the term "held" shall mean a unit wherein the bearing assembly is fixed against at least axial displacement in the pillow block. Pillow blocks are typically used to rotatably mount journals or the like and in most instances are used in at least pairs for rotatably supporting a large unit mounted for rotation between the pillow blocks in the manner illustrated, for example, in FIG. 1.

FIGS. 2 and 3 show a conventional pillow block assembly including means for converting the pillow block from a free to a held unit.

Typically the pillow block comprises a housing A having a cylindrical internal seat or cavity B for a bearing assembly C consisting usually of an inner ring D mounted on a shaft or journal E and an outer ring F mounted in the seat in the pillow block housing. The bearing has labyrinth seals G at opposite axial ends and a pair of retaining rings H which as illustrated in FIG. 2 are spaced apart an axial distance greater than the length of the outer ring to allow for limited axial movement of the bearing assembly in the pillow block.

In most installations involving a plurality of pillow blocks, assembly requirements and variable operating conditions dictate that at least one of the pillow blocks be a free unit and the other a held unit. For example, in an installation such as that illustrated in FIG. 1, the combination of a held and free unit allows for axial movement of the bearing assembly in the free unit to compensate for expansion due, for example, to temperature variations. At present most suppliers of this type of equipment provide two distinct pillow block assemblies, a free unit of the type illustrated in FIG. 2 and a held unit of the type illustrated in FIG. 3. The held unit includes a stabilizing ring J disposed between one of the retaining rings and the axial end face of the outer ring of the bearing. These units are supplied as complete assemblies, lubricated at the factory ready for assembly on the shaft. As a practical matter, it has been found that conversion from free to a held unit or vice versa is impractical since it usually requires destruction of the outer seal. Conversion also runs the risk of contaminating the lubricant in the unit.

A further drawback is the fact that separate inventories are required which adds to the overall cost of manufacture.

SUMMARY OF THE INVENTION

The present invention provides a relatively simple externally accessible device for converting a single pillow block assembly from a held unit to a free unit or vice versa. In the principal embodiment of the invention the device consists of a screw member engageable in a threaded bore in the pillow block housing for an inner terminal tip portion of a predetermined configuration to engage in a circumferential recess in the outer ring which is operable between a locked position preventing at least axial movement of the outer ring relative to the pillow block housing and a retracted position permitting free axial movement therein. The conversion device includes indicia means so that the position of the device and therefore whether the pillow block is a held or free unit may be determined by visual inspection. The conversion device also includes means for lubricating the bearing assembly.

With the foregoing in mind, an object of the present invention is to provide a novel means accessible externally of the pillow block housing for selectively converting a single pillow block assembly from a free unit to a held without damaging parts of the assembly or incurring the risk of contaminating the lubricant in the bearing.

Another object of the present invention is to provide an external conversion device which is of relatively simplified construction, does not complicate the construction or design of a pillow block and does not add materially to the cost of manufacturing and assembling the basic unit.

A further object of the present invention is to provide an external pillow block converting device so that a single pillow block design may be easily converted from free to held unit without disassembly of parts.

A further object of the present invention is to standardize for a given pillow block design the parts comprising the unit and thereby reduce the level of inventory required for manufacturing these units.

BRIEF DESCRIPTION OF THE DRAWINGS

These and other objects of the present invention and the various features and details of the operation and construction thereof are hereinafter more fully set forth with reference to the accompanying drawings wherein:

FIG. 1 is a side elevational view of a typical pillow block installation for mounting a rotatable drum unit or the like;

FIG. 5 is a sectional view taken on lines 5—5 of FIG. 4 showing the conversion device in an armed position for a held unit;

FIG. 6 is an enlarged fragmentary sectional view taken on lines 6—6 of FIG. 5;

FIG. 7 is a fragmentary sectional view showing the conversion device in a retracted position for a free unit;

FIGS. 8–15 inclusive are fragmentary sectional views showing other embodiments of conversion devices in accordance with the present invention; and FIG. 16 is a fragmentary end elevational view of the embodiment of pillow block conversion device illustrated in FIG. 15.

DESCRIPTION OF THE ILLUSTRATED EMBODIMENTS

Figure 1:
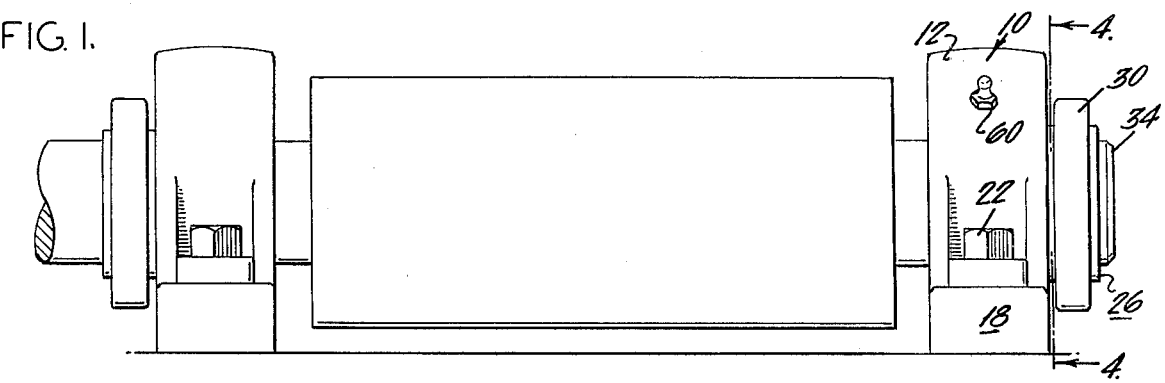
Figure 2:
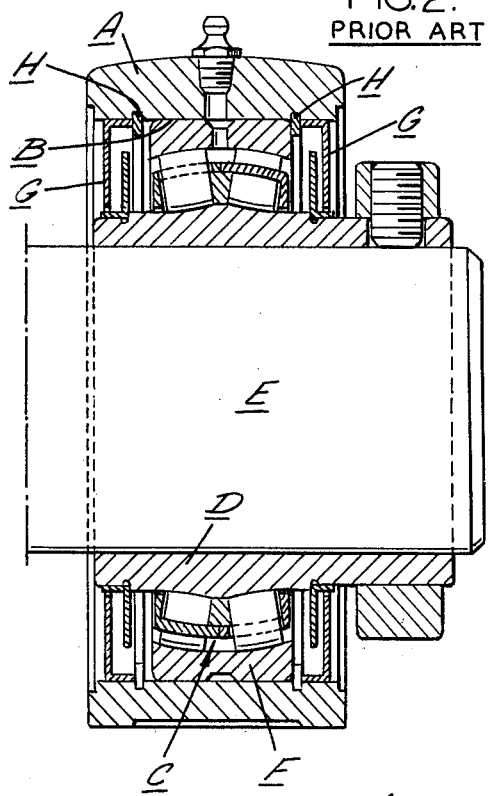
FIGS. 2 and 3 are sectional views through the pillow block showing typical prior art pillow block assemblies.
Figure 3:
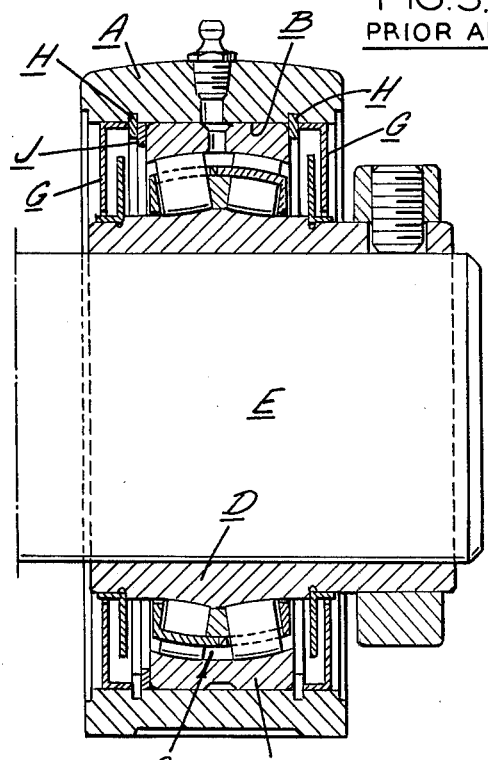
Figure 4:
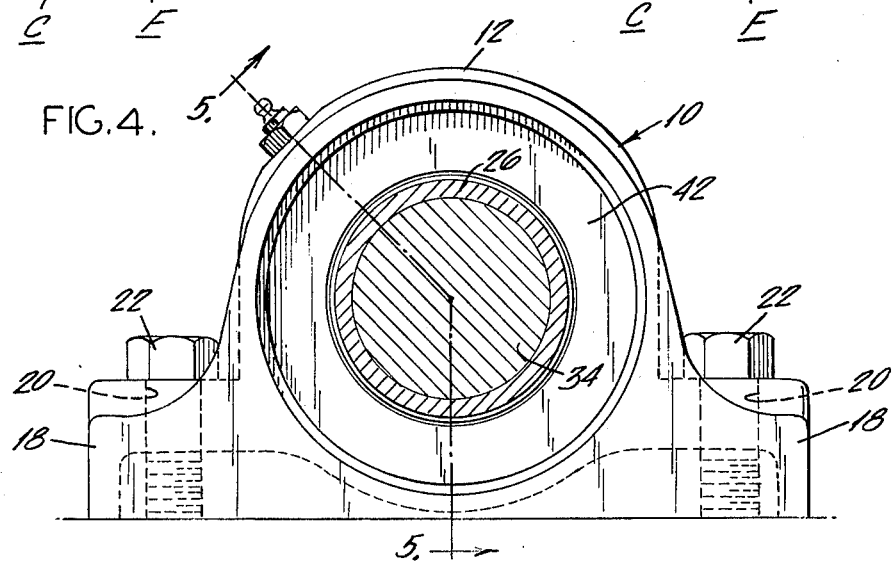
FIG. 4 is an end elevational view partly in section incorporating an external conversion arrangement in accordance with the present invention for selectively converting a pillow block from a free or a held unit or vice versa.

Referring now to the drawings and particularly to FIGS. 4 and 5 thereof, there is illustrated a pillow block assembly generally designated by the numeral 10 incorporating means in accordance with the present invention for conversion from a free to held or held to free unit. The general arrangement and overall configuration of the pillow block is conventional and comprises a housing 12 having an interior surface defining a seat 14 for a rolling bearing assembly 16. The pillow block housing has foot extensions 18 with holes 20 for bolts 22 to secure the assembly to a support or base. The bearing assembly 16 illustrated is a double row spherical roller bearing including an inner ring 26 having an axial extension 28 for a collar 30 and set screw 32 to mount the inner ring to a shaft member 34. The outer ring 36 has a common spherical raceway 38 for the two rows of rollers 39. The bearing assembly includes the usual cage 40 for guiding and circumferentially spacing the rollers. A labyrinth seal at each axial end of the bearing consisting of an outer place seal 42 press fitted in the seat 14 of the pillow block housing and a flinger 44 mounted on the inner ring 26 prevents ingress of dirt and foreign matter to the bearing.

The inner peripheral surface or seat 14 of the pillow block housing has two axially spaced circumferentially extending grooves 50 for retaining rings 52. In the present instance, the retaining rings 52 are fixed and spaced apart axially a greater distance than the axial length of the outer ring 36 allowing for axial movement of the bearing assembly relative to the pillow block housing.

In accordance with the present invention, means is provided for converting the pillow block from a free to a fixed or held unit. The means comprises as illustrated in FIGS. 6 and 7, a screw member 60 having a threaded shank 62 which terminates in a conical tip 64. The shank 62 engages in a threaded hole or bore 65 in the pillow block housing and is of a predetermined length so that when the head 69 is fully seated against the flat 70, the conical tip 64 seats in a circumferential groove 66 in the outer ring of the bearing which has complementary tapered sidewalls 68. There is a slight clearance between the tip 64 and groove 66 to preclude pinching the bearing but the seating is such to prevent axial movement of the outer ring in the pillow block housing. When the head 69 of the screw member is flush against a flat 70 on the exterior of the pillow block housing, the threaded bore 65 is centered relative to the retaining rings 52 so that the outer ring is equispaced from the retaining rings in the held position (FIG. 5), the groove 66 being centered between the axial ends of the outer ring. In this way, the outer ring exerts no load on the retaining ring 52 and the bearing is centered in the pillow block housing. Note the flat 70 provides a flush seat for the head 69 and in a sense prevents bottoming out of the screw member in the groove 66. In the present instance the head 69 of the screw member has a lubricant fitting 71 and the shank 62 has an internal bore 72 so that the bearing may be lubricated. The assembly may be converted to a free mounting arrangement simply by unthreading the screw element and placing a lock washer 74 or the like between the head 69 and the flat 70 as illustrated in FIG. 7. The washer 74 is preferably of a thickness at least greater than the axial projection of the conical tip 64 to allow unobstructed floating movement of the outer ring when the pillow block is a free unit. This arrangement provides an immediate visual indicia as to whether the unit is free or held and still permits direct lubrication of the bearing. The outer ring has radial ports 76 providing fluid communication between screw member 60, groove 66 and the interior of the bearing for lubrication purposes.

While the pillow block conversion device of the present invention has been illustrated and described in connection with a unitary pillow block assembly, it can be applied as well to other types of pillow blocks, for example, split pillow blocks either singular or in multiples.

There is illustrated in FIG. 8 a modified form of locking unit for a pillow block in accordance with the present invention. The pillow block has an inner peripheral surface or seat 14a with two axially spaced circumferentially extending grooves 50a for retaining rings 52a which as illustrated are fixed and spaced apart axially a greater distance than the axial length of the outer ring 36 allowing for axial movement of the bearing assembly relative to the pillow block housing. Labyrinth seals 42a are mounted at opposite axial ends of the bearing. The device is similar to that previously described except that, in the present instance, the conical tip of the shank portion is provided with a short cylindrical extension 80 adapted to engage one of the radial ports 76 in the outer ring of the bearing through which the lubricant normally enters into the space between the inner and outer rings. The conversion device therefore fixes the outer ring against axial displacement and also prevents rotation of the outer ring relative to the pillow block housing. When the pillow block is a free unit, a lock washer is used as illustrated in FIG. 7. The washer is preferably of a thickness greater than the conical tip and the cylindrical projection to ensure free movement of the outer ring.

FIG. 9 shows a still further modification of a conversion device 90 in accordance with the present invention. The pillow block has an inner peripheral surface or seat 14b with two axially spaced circumferentially extending grooves 50b for retaining rings 52b which as illustrated are fixed and spaced apart axially a greater distance than the axial length of the outer ring 36 allowing for axial movement of the bearing assembly relative to the pillow block housing. Labyrinth seals 42b are mounted at opposite axial ends of the bearing. The head, shank and lubrication port are essentially as described above in connection with the embodiment of FIGS. 5 and 6 and, therefore, given the same reference numerals. In this instance, the tip of the shank is a cylindrical projection 92 and the circumferential groove 94 in the outer ring has spaced radial sidewalls 96 closely conforming in width to the diameter of the projection of the screw member. As in the previously described assembly when the screw member is fully seated, the pillow block is a held unit. For a free pillow block, a lock washer is used which is preferably of a thickness greater than the projection 92 of the tip portion of the screw member.

There is illustrated in FIG. 10 another embodiment of externally mounted device 100 for converting a pillow block between free and held positions. The pillow block has an inner peripheral surface or seat 14c with two axially spaced circumferentially extending grooves 50c, 51c for retaining rings 52c, 53c and labyrinth seals 42c outboard of the retaining rings. The retaining rings are spaced apart an axial distance greater than the width of the outer ring 36 to permit limited axial movement of the outer ring in the seat. In this instance, the pillow block housing is provided with a tapped hole 102 radially disposed adjacent one of the annular grooves 51c in the seat of the pillow block for the retaining ring. The conversion device 100 in this embodiment comprises a set screw 106 having a conical tip 108 at its inner end and the usual socket recess for a tool to turn the screw in its outer axial end face. When the set screw if fully seated (FIG. 10), the conical tip 108 engages the outer peripheral edge of the outer bearing ring to displace the outer ring to a position abutting the retaining ring at the opposite end of the pillow block housing. When the set screw 106 is retracted so that the head projects slightly above the outer peripheral face of the pillow block, the outer bearing ring may move axially between the retaining rings and the projection of the outer end of the set screw provides a visual indicating means that the outer ring of the bearing is free to float and the pillow block is therefore a free unit.

FIG. 11 shows a modification of the conversion device shown in FIG. 10 and is designated by the numeral 110. The pillow block has an inner peripheral surface or seat 14d with two axially spaced circumferentially extending grooves 50d, 51d for retaining rings 52d, 53d and labyrinth seals 42d outboard of the retaining rings. The retaining rings are spaced apart an axial distance greater than the width of the outer ring 36 to permit limited axial movement of the outer ring in the seat. In this instance, the set screw is provided with a cylindrical projection or dog point 112 which is of a diameter slightly less than the total initial clearance between the outer bearing ring and retaining rings.

FIG. 12 shows a further modification of conversion device generally designated by the numeral 120 for positioning a pillow block as a held or free unit. The pillow block has an inner peripheral surface or seat 14e with two axially spaced circumferentially extending grooves 50e, 51e for retaining rings 52e, 53e and labyrinth seals 42e outboard of the retaining rings. One of the grooves is enlarged to permit floating axial movement of the retaining ring 53e. When the retaining ring 53e is in an outer position, the retaining rings are spaced apart an axial distance greater than the width of the outer ring 36 to permit limited axial movement of the outer ring in the seat. In this instance, the pillow block housing has a tapped bore 122 angularly oriented in the pillow block housing which as illustrated extends from the outer peripheral edge at one axial end of the housing to the groove 51e for one of the retaining rings 53e. In this instance the groove 51e is enlarged to permit floating movement of the retaining ring 53e. A set screw 128 engages in the hole or bore 122 and is actuatable between an inner position pressing the retaining ring 53e against the axial end face of the outer ring of the bearing (held unit) and a retracted position permitting the retainer ring 53e at the one axial end to float in the enlarged groove and thereby position the pillow block as a free unit. The outer side edge portion of the pillow block is flat 129 adjacent the set screw bore to provide a start for drilling and tapping and also a visual and feel indication of its position.

FIG. 13 shows conversion device somewhat similar to the arrangement of FIG. 12. The pillow block has an inner peripheral surface or seat 14f with two axially spaced circumferentially extending grooves 50f, 51f for retaining rings 52f, 53f and labyrinth seals 42f outboard of the retaining rings. One of the grooves is enlarged to permit floating axial movement of the retaining ring 53f. When the retaining ring 53f is in an outer position, the retaining rings are spaced apart an axial distance greater than the width of the outer ring 36 to permit limited axial movement of the outer ring in the seat. In this instance the pillow block housing is provided with one or more tapped radial holes or bores 130 adjacent one axial end face for a set screw 132 having a dog extension 134 and one of the retaining rings 53f is mounted for axial floating movement in an enlarged groove 50f in the seat of the pillow block housing. When it is desired to position the pillow block in a held position, the outer plate seal 140 of seal 142 is moved axially inwardly to, in turn, move the retaining ring 50f flush against outer ring of the bearing to the position shown in FIG. 13. The set screw 132 is then turned inwardly so that the dog 134 abuts the outer face of the outer plate seal 140. Of course the pillow block may be converted to a free unit simply by retracting the set screw so that the dog is out of the path of the outer labyrinth and moving the bearing against the retaining ring 50f and moving the outer plate seal outboard.

FIG. 14 shows an arrangement similar to FIG. 13. The pillow block has an inner peripheral surface or seat 14g with two axially spaced circumferentially extending grooves 50g, 51g for retaining rings 52g, 53g and labyrinth seals 42g outboard of the retaining rings. One of the grooves is enlarged to permit floating axial movement of the retaining ring 53g. When the retaining ring 53g is in an outer position, the retaining rings are spaced apart an axial distance greater than the width of the outer ring 36 to permit limited axial movement of the outer ring in the seat. In this instance, however, a third retaining ring 150 is provided. This retaining ring which engages in a groove 152 outboard of enlarged groove 51g is spaced a predetermined distance from the enlarged groove 51g to eliminate play between the outer ring and the retaining rings 52g. This distance, of course, will vary depending on the projection or the length of the axial leg 42a of the outer plate seal 42. The unit is illustrated in the held position and may be assembled in this position by simply moving the outer plate seal of labyrinth seal and then snapping the retaining ring 150 into the outer groove 152. The pillow block may be converted to a free unit simply by removing the retaining ring 150, moving the outer plate seal outboard by moving the bearing outwardly.

FIGS. 15 and 16 show a modified arrangement similar to FIG. 14. The pillow block has an inner peripheral surface or seat 14h with two axially spaced circumferentially extending grooves 50h, 51h for retaining rings 52h, 53h and labyrinth seals 42h outboard of the retaining rings. One of the grooves is enlarged to permit floating axial movement of the retaining ring 53h. When the retaining ring 53h is in an outer position, the retaining rings are spaced apart an axial distance greater than the width of the outer ring 36 to permit limited axial movement of the outer ring in the seat. In this instance an L-shaped bracket 160 which may be mounted to the axial end face of the pillow block by screws 162 engages the labyrinth seal to press the retaining ring and outer ring of the bearing assembly to a held position. The axial leg 164 of the bracket is of a predetermined length to ensure complete take-up of the play between the outer ring and the bearing housing when it is mounted flush in the manner illustrated in FIG. 15. Several of these brackets may be positioned at circumferentially spaced locations about the pillow block housing. The pillow block may be converted to a free unit by removing the brackets and moving outer plate seal 165 outboard, as in FIG. 14.

In the embodiments illustrated in FIGS. 5–13 inclusive, only one screw member is shown. Even though a single screw member is effective, if desired several may be provided at circumferentially spaced locations and if a number are used, they need not be of the same design or configuration.

What is claimed is:

1. A pillow block assembly including a housing having an internal seat for a bearing having inner and outer rings and retaining means on opposite sides of said outer rings for limiting axial displacement of the bearing in the bearing seat, said retaining means comprising a pair of axially spaced circumferential grooves in the seat of the pillow block and a pair of retaining rings engaging in said grooves, one of said grooves being enlarged to permit limited axial displacement of the retaining ring mounted therein and means for selectively positioning one of said pair of retaining rings in said groove in a position preventing axial movement of the outer ring in the pillow block housing.

2. A pillow block assembly as claimed in claim 1 wherein said means for selectively positioning comprises a screw member mounted in said housing engageable with said one retaining ring to move it to a position wherein the spacing between confronting faces of the retaining rings equals the width of the outer ring to prevent axial movement of the outer ring in the pillow block housing.

3. A pillow block assembly including a housing having a peripheral internal seat for a bearing comprising inner and outer rings and conversion means for converting the pillow block between free and held units including retaining means disposed on opposite axial ends of said outer ring for limiting axial displacement of the outer ring in the bearing said retaining means comprising first and second axially spaced circumferentially extending grooves in the seat of the pillow block and first and second retaining rings engaging in said grooves, said first groove being enlarged to permit limited axial displacement of said first retaining ring mounted therein and a third groove in the pillow block seat outboard of said enlarged first groove and a third retaining ring mounted in said third groove, said third retaining ring being spaced in a manner to eliminate play between said first and second retaining rings and said outer ring to position the pillow block as a held unit and being removable to convert the pillow block to a free unit.

4. A pillow block assembly including a housing having an internal peripheral seat for a bearing having at least an outer ring and conversion means for converting the pillow block between free and held units, said conversion means including retaining means comprising circumferential grooves in the peripheral seat of the pillow block adjacent opposite axial ends of the outer ring, a retaining ring in each of said grooves spaced apart an axial distance greater than the width of the outer ring to permit limited axial movement of the outer ring in the seat, a seal in the pillow block outboard of said retaining rings and means accessible externally of the pillow block housing operable between a first position permitting limited movement of the outer ring in the seat and a second position engaging the outer ring preventing axial movement of the outer ring in the pillow block, actuation of said means alone permitting conversion of the pillow block between free and held units.

5. A pillow block assembly as claimed in claim 4 wherein said means accessible externally of the pillow block housing comprises a screw member including a conical tip which engages in an annular groove in the outer ring having tapered circumferential sidewalls complementing the tip of the screw member.

6. A pillow block as claimed in claim 5 including means defining a port extending through said screw member, said screw member including a head portion with a lubricant fitting and means defining at least one radial port in the outer ring connecting said annular groove to the interior of the bearing, the arrangement permitting lubrication of the bearing through the screw member.

7. A pillow block as claimed in claim 6 including a cylindrical projection extending from said conical tip engageable in said radial port.

8. A pillow block as claimed in claim 4 wherein said means accessible externally of the pillow block housing comprises a screw member including a threaded shank portion and a projection extending from one end of said shank portion engageable in an annular groove in the outer ring having radial sidewalls spaced apart a distance slightly greater than the diameter of said projection.

9. A pillow block as claimed in claim 4 wherein means accessible externally of the pillow block housing comprises a set screw having a tip engageable between the axial end face of the outer ring and one of said retaining rings.

10. A pillow block as claimed in claim 4 wherein one of said grooves is enlarged to permit limited axial displacement of the retaining ring mounted therein and wherein said means accessible externally of the pillow block housing comprises a screw member mounted in said pillow block in a position to displace said one retaining ring.

11. A pillow block assembly including a housing having an internal seat for a bearing having inner and outer rings and retaining means on opposite sides of said outer ring for limiting axial displacement of the bearing in the bearing seat, said retaining means comprising a pair of axially spaced circumferential grooves in the seat of the pillow block and a pair of retaining rings engaging in said grooves, said retaining rings being spaced apart axially a distance greater than the width of said outer ring to permit limited axial movement of said outer ring in said seat and screw means adjustably mounted in said pillow block between an outer position permitting axial movement of said outer ring between said retaining rings and an inner position wherein a portion thereof engages between one of said retaining rings and said outer ring preventing axial movement of said outer ring in the pillow block housing.

* * * * *